2,925,427
Patented Feb. 16, 1960

2,925,427

PROCESS FOR THE PRODUCTION OF 19-NOR-4-PREGNEN-21-OL-3,20-DIONE

Carl Djerassi, Birmingham, Mich., and Franz Sondheimer, Alberto Sandoval, and George Rosenkranz, Mexico City, Mexico, assignors to Syntex S.A., Mexico City, Mexico, a corporation of Mexico No Drawing. Application January 25, 1955
Serial No. 484,064

Claims priority, application Mexico February 3, 1954

5 Claims. (Cl. 260—397.4)

The present invention relates to novel cyclopentanophenanthrene compounds and to a novel process involving these compounds.

More particularly the present invention relates to the production of $\Delta^4$-19-nor-pregnen-21-ol-3,20-dione (19-nor-desoxycorticosterone) and to novel intermediates for the production thereof. The final products of the process of the present invention, 19-nor-desoxycorticosterone or its esters, are active cortical hormones having a higher activity than the cortical hormone desoxycorticosterone.

In accordance with the present invention a novel method has been discovered for the preparation of 19-nor-desoxycorticosterone from the known compound methyl 3-methoxy-1,3,5-estratriene-17-carboxylate and involving as novel intermediates 17-hydroxymethyl-$\Delta^4$-estren-3-one and 3-keto-$\Delta^4$-estren-17-carboxylic acid (3-keto-19-nor-etiocholenic acid).

The novel process of the present invention may be exemplified by the following equation:

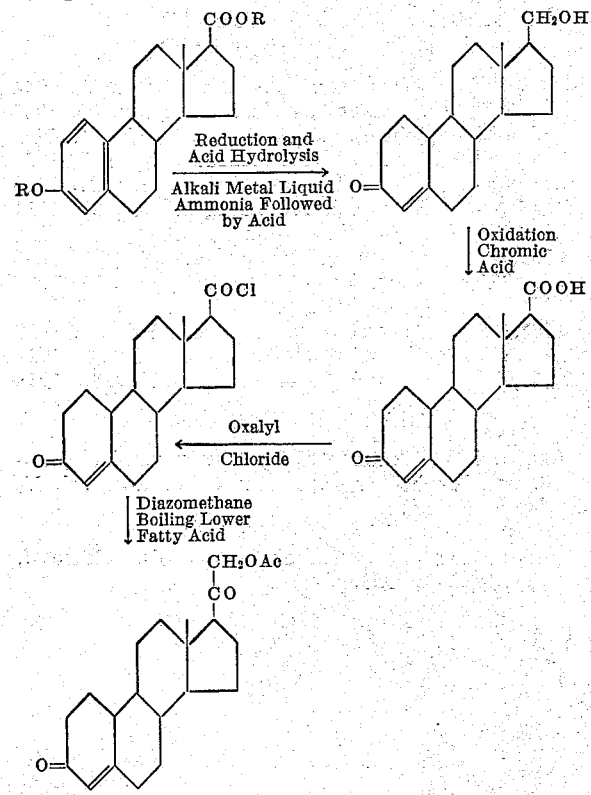

In the above equation R represents a lower alkyl group preferably a methyl group.

In practicing the process above outlined a 3-hydroxy-1,3,5(10)-estratriene-17-carboxylic acid derivative having the hydroxyl groups protected by the formation of a lower alkyl ester and a lower alkyl ether, as for example, methyl 3-methoxy-1,3,5(10)-estratriene-17-carboxylate (a known compound described by Djerassi and Scholz, J.A.C.S., 71, 3962, 1949) is dissolved in an inert organic solvent such as ether and mixed with liquid ammonia. There is thereafter added with continuous stirring an alkali metal preferably lithium during a substantial period of time of the order of 20 minutes. The stirring was thereafter continued for a few more minutes and absolute alcohol was then added preferably in two increments spaced about 10 minutes apart. The solution was then allowed to evaporate to dryness. Water was then added to the residue and the collected precipitate washed until neutral. The precipitate of 17-hydroxymethyl-3-methoxy-$\Delta^{2,5(10)}$-estradiene was not further purified but used for the next steps of acid hydrolysis.

The 17-hydroxymethyl-3-methoxy-$\Delta^{2,5(10)}$-estradiene was preferably dissolved in a lower alcohol solvent and hydrolysed by heating with acid preferably a mineral acid such as hydrochloric. The resultant compound was the corresponding 17-hydroxymethyl-$\Delta^4$-estren-3-one.

Upon oxidation with chromic acid preferably in acetic acid at room temperature the 17-hydroxymethyl-$\Delta^4$-estren-3-one compound is oxidized to the corresponding 17-carboxylic acid i.e. 3-keto-$\Delta^4$-estren-17-carboxylic acid. This last compound on treatment of the sodium salt with oxalyl chloride at a low temperature of the order of 0° C. for a period of time of the order of three hours gave the corresponding acid chloride. Treatment of the acid chloride with diazomethane followed by treatment of the product of this reaction with a lower fatty acid such as acetic then gave the desired lower fatty acid ester of $\Delta^4$-19-nor-pregnen-21-ol-3,20-dione (the lower fatty acid ester of 19-nor-desoxycorticosterone). Obviously, these esters could be converted to the free compound by conventional saponification.

The following specific examples serve to illustrate but are not intended to limit the present invention:

*Example I*

10 g. of methyl 3-methoxy-1,3,5(10)-estratriene-17-carboxylate (prepared in accordance with Djerassi and Scholz, J.A.C.S., 71, 1962, 1949) was dissolved in 800 cc. of anhydrous ether and mixed with 1015 cc. of liquid ammonia. Under continuous stirring, this solution was treated in the course of 20 minutes with 15 g. of lithium metal. The stirring was continued for 30 minutes (additional 10 minutes) and then 115 cc. of absolute alcohol was added; after a further 10 minutes 100 cc. more of alcohol was added and the solution was allowed to evaporate to dryness. Water was added to the residue and the precipitate was collected and washed until neutral, thus giving 9.6 g. with a melting point of 114°–117° C.

9 g. of this product was dissolved in 450 cc. of methanol and mixed with 270 cc. of 3-normal hydrochloric acid. The mixture was heated at 60° C. for 30 minutes and then poured into water. The mixture was extracted with three portions of ether and the combined ether extract was washed with sodium carbonate solution and water until neutral and evaporated to dryness. Crystallization of the residue from acetone afforded 4.8 g. of 17-hydroxymethyl-$\Delta^4$-estren-3-one with a melting point of 135°–137° C.

*Example II*

A solution of 0.13 g. of chromic acid in three drops and water and 2 cc. acetic acid was added in the course of 10 minutes to a stirred solution of 0.5 g. of 17-hydroxymethyl-$\Delta^4$-estren-3-one in 20 cc. of glacial acetic acid, at room temperature. The stirring was continued for a further 10 minutes and the solution was kept standing overnight, poured into water and the precipitate was filtered and washed. The solid residue was digested with a 10% solution of potassium hydroxide; the soluble fraction was separated by filtration and the solution was acidified with hydrochloric acid. A precipitate separated from the acid solution which was collected and washed, thus producing 0.36 g. of 3-keto-$\Delta^4$-estren-17-carboxylic acid with a melting point of 256°–259° C., $[\alpha]_D$ 98° (chloroform).

*Example III*

0.492 g. of 3-keto-$\Delta^4$-estren-17-carboxylic acid was dissolved in 15 cc. of methanol. The solution was cooled to 0° C. and treated in the course of 30 minutes under continuous stirring with a solution of sodium hydroxide in methanol, containing 0.94 molar equivalents of the base (14 cc. of a 0.109 N solution). The solvent was removed under vacuum and the residue was dried under vacuum for 18 hours. The sodium salt was triturated with 15 cc. of anhydrous ether, the mixture was cooled in an ice bath and then 2 cc. of recently distilled oxalyl chloride was added. The solution was kept for three hours at 0° C. and then evaporated to dryness. Anhydrous benzene was added to the residue and again it was evaporated to dryness. This process was repeated twice.

The acid chloride thus obtained was dissolved in benzene and filtered. The filtrate was added under stirring to an ether solution of diazomethane (obtained from 5.0 g. of nitrosomethylurea) at a temperature of —20° C. The solution was kept for one hour at 0° C. and then evaporated to dryness under reduced pressure. The gummy residue was immediately treated with 20 cc. of boiling acetic acid and the solution was refluxed for three minutes, cooled and extracted with ether. The ether solution was washed to neutral, dried and evaporated to dryness. The residue was then chromatographed in a column with neutral alumina, and the fractions eluted with benzene yielded 176 mg. of the acetate of 19-nor-$\Delta^4$-pregnen-21-ol-3,20-dione with a melting point of 153°–159° C. Recrystallization from acetone afforded 132 mg. of the pure compound with a melting point of 168°–170° C., identical with a sample prepared in accordance with the method described in our United States patent application Serial Number 390,723, filed November 6, 1953, now Patent No. 2,861,085.

We claim:

1. A process for the production of a lower fatty acid ester of 19-nor-desoxycorticosterone which comprises reducing a compound of the formula:

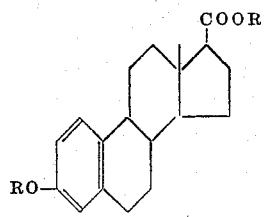

wherein R represents a lower alkyl group, with an alkali metal in liquid ammonia, hydrolysing the reduction product with acid to form 17-hydroxymethyl-$\Delta^4$-estren-3-one, oxidizing the last mentioned compound with chromic acid to form 3-keto-$\Delta^4$-estren-17-carboxylic acid, treating the last mentioned compound with oxalyl chloride to form the corresponding acid chloride and treating acid chloride with diazomethane followed by heating with a lower fatty acid.

2. A process for the production of 17-hydroxymethyl-$\Delta^4$-estren-3-one which comprises reducing a compound of the formula:

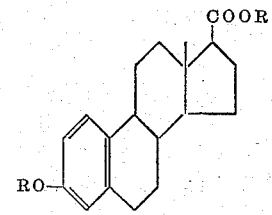

wherein R represents a lower alkyl group, with an alkali metal in liquid ammonia and hydrolysing the reduction product with acid.

3. The process of claim 2 wherein the lower alkyl groups are methyl groups and the alkali metal is lithium.

4. A process for the production of 3-keto-$\Delta^4$-estren-17-carboxylic acid which comprises oxidizing 17-hydroxymethyl-$\Delta^4$-estren-3-one with chromic acid.

5. 17-hydroxymethyl-$\Delta^4$-estren-3-one of the following formula:

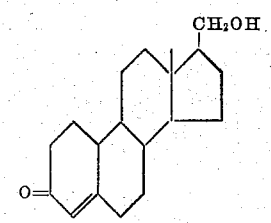

References Cited in the file of this patent

UNITED STATES PATENTS

| | | |
|---|---|---|
| 2,259,698 | Johannessohn | Oct. 21, 1941 |
| 2,309,408 | Miescher | Jan. 26, 1943 |
| 2,374,683 | Julian | May 1, 1945 |
| 2,496,450 | Ehrenstein | Feb. 7, 1950 |
| 2,530,816 | Ehrenstein | Nov. 21, 1950 |
| 2,573,418 | Ehrenstein | Oct. 30, 1951 |
| 2,748,149 | Reichstein | May 29, 1956 |
| 2,759,929 | Farrar | Aug. 21, 1956 |
| 2,759,951 | Djerassi et al. | Aug. 21, 1956 |
| 2,774,777 | Djerassi et al. | Dec. 18, 1956 |
| 2,781,365 | Djerassi et al. | Feb. 12, 1957 |
| 2,788,352 | Djerassi et al. | Apr. 9, 1957 |
| 2,861,085 | Djerassi et al. | Nov. 18, 1958 |

OTHER REFERENCES

Sandoval, A., Meramontes, L., Rosenkranz, G., Djerassi, C., and Sondheimer, F.: J. Am. Chem. Soc., vol. 75, 4117–4118 (1953).

Wilds: J.A.C.S., 75, 5366–5369, 1953.

Rodd: Chemistry of Carbon Compounds, volume II, part B, page 941, 1953.